Dec. 28, 1926.
R. MATTEUCCI
CHANGE SPEED GEAR
Filed May 28, 1925
1,612,458
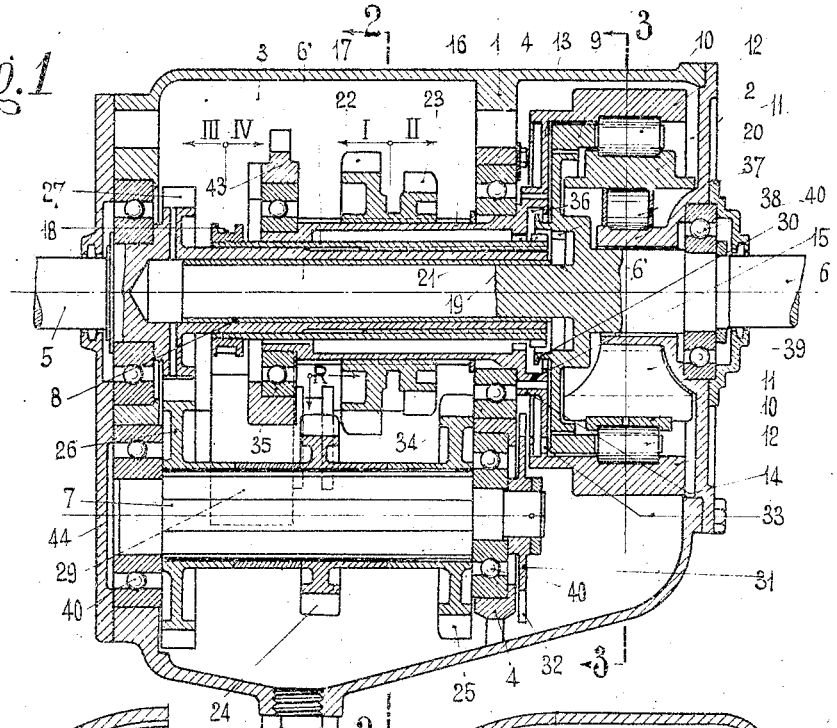
Fig. 1
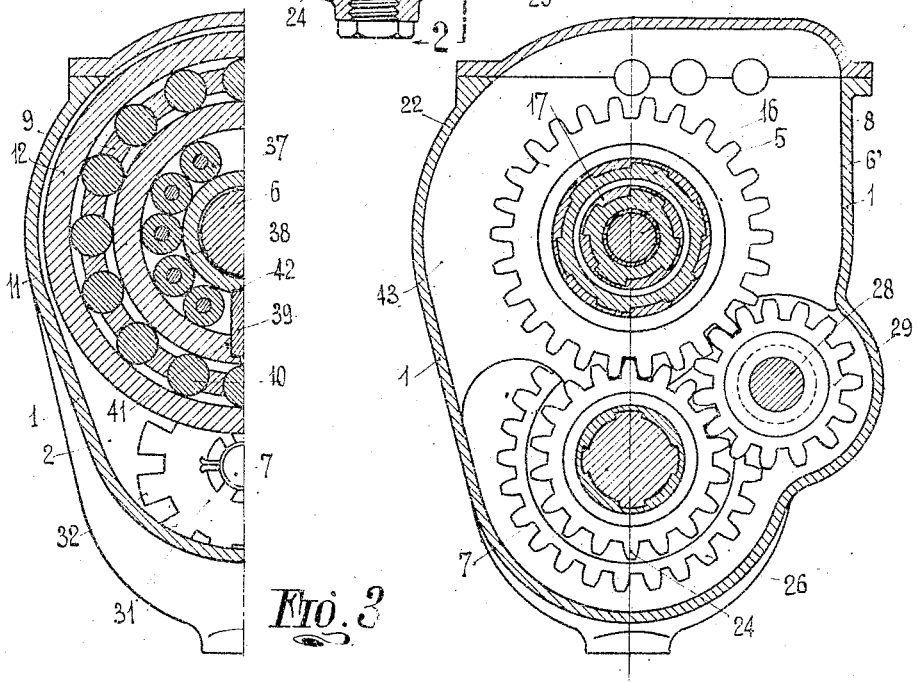
Fig. 3
Fig. 2
Inventor
R. Matteucci
by Langner, Parry, Card & Langner Attys.

Patented Dec. 28, 1926.

1,612,458

UNITED STATES PATENT OFFICE.

RAFFAELE MATTEUCCI, OF TURIN, ITALY.

CHANGE-SPEED GEAR.

Application filed May 28, 1925, Serial No. 33,521, and in Italy June 6, 1924.

The present invention has for its object a change speed gear for motor vehicles comprising in combination a roller planetary speed reducing gear operating by positive action of adhesion and a change speed gear, and in which a driven shaft is permanently connected with the roller-carrier of said planetary gear and said gear is driven by a driving shaft either directly or through the intermediate of said change speed gear which actuates the movable rim of said planetary gear, in order to obtain a number of different speed ratios for said driven shaft.

On the annexed drawing is illustrated by way of example, as an embodiment of the present invention, a change speed gear with four speeds and reverse according to the present invention, and:—

Figure 1 is a longitudinal section of the same on a plane passing through the axes of the driving and driven shafts;

Figure 2 is a transverse section on line 2—2 of Figure 1 and

Figure 3 is a fragmentary section on line 3—3 of Figure 1.

In said figures, 1 is a casing divided in chambers 2 and 3 by an intermediate partition 4 and in said casing 1 are mounted a driving shaft 5, a driven shaft 6 and a countershaft 7 by means of ball bearings 40.

In the construction illustrated, the driving shaft 5 and the driven shaft 6 are held in aligned position by means of an extension 6' of said driven shaft which extension is seated in a bushing 8 located in a central recess of the shaft 5, but of course said shafts may be mounted in any other suitable manner.

The driven shaft 6 is solid in rotation with a roller-carrier 9 of a planetary gear comprising rollers 10 running on the outer surface of a stationary split and self-expansible rim 11, and on the internal surface of a rim 12.

The rim 11 is mounted, by the intermediate of positioning rollers 37, on a stationary hub 38 solid with casing 1, and a wedge 39 engaged in slots 41 and 42 of said rim and hub provides for adjusting the expansion of said split rim.

A sleeve 16 which is supported in the casing 1 by means of bearings 34 and 35 arranged in partitions 4 and 43 of casing 1, is solid in rotation with the rotary rim 12 of said planetary gear by means of a toothed flange 15 which engages a toothed sleeve 14 provided on the flange 13 of said rim 12.

By the described arangement said planetary gear may be easily detached from other parts of the gear by withdrawing said sleeve 14 from toothed flange 15.

Within said hollow sleeve 16 is arranged a sleeve 17 which is solid in rotation with the driving shaft 5 and is adapted to slide longitudinally along it under the control of a fork member, not shown, engaging a collar 18 provided at one end of said sleeve 17; the other end of sleeve 17 has teeth 19 adapted to removably engage either teeth 20 of said roller carrier 9 or teeth 21 of the outer sleeve 16.

Therefore by an endwise displacement of said sleeve 17 the driving shaft 5 may be connected directly either with the roller carrier 9 or with the rim 12 of the planetary gear, this rim being solid in rotation with the sleeve 16 by means of parts 13—14—15 as above described.

The sleeve 16 has pinions 22 and 23 of different diameters connected with it in rotation but loose longitudinally thereof said pinions being adapted to mesh respectively with pinions 24 and 25 carried by countershaft 7 which is arranged in the space between the partition 4 and the casing front wall 44, said countershaft carrying a pinion 26 solid with it and in permanent mesh with a pinion 27 solid with the shaft 5. On a stationary side stud 28 (see Figure 2) is mounted an idle pinion 29 adapted to be shifted endwise to mesh with pinions 24 and 22 in order to provide for reverse running, said pinion having a longitudinal size or thickness adapted to mesh with both pinions 24 and 22 at the same time when they are out of mesh with and at the side of each other.

The operation of the gear is as follows:—

In the conditions shown on the drawing the driven shaft is at rest while the driving shaft is being actuated, teeth 19 of sleeve 17 solid with driving shaft 5 being released from both teeth 21 and 20 and pinions 22—23 and 29 being out of mesh with cooperating ones.

The first or lowest speed is obtained by leaving teeth 19 of sleeve 17 released from teeth 20 and 21 and by carrying pinion 22 in mesh with pinion 24; then the drive is transmitted from shaft 5, pinions 27—26, countershaft 7, pinions 24—22, sleeve 16, to rim 12 of the planetary gear, the driven shaft 6 being thus actuated by the roller carrier 9 which is driven by rollers 10 driven in turn by rim 12 and caused to run on the stationary rim 11.

A higher or second speed is obtained by carrying in mesh pinions 23 and 25, the operation being as above described and the speed ratio being modified on account of the different ratio between the pinions 23 and 25.

For obtaining a third speed, pinions 22 and 23 are carried out of mesh with respect to pinions 24 and 25 and sleeve 17 is moved by its collar 18 so as to engage its teeth 19 with the teeth 21. The driving shaft 5 is thus caused to directly actuate the rotary rim 12 of the planetary gear, while the driven shaft 6 is actuated by roller carrier 9 at the transmission ratio of the planetary gear.

Direct drive is obtained by shifting sleeve 17 to engage its teeth 19 with teeth 20 of the roller carrier 9 which is integral with driven shaft 6; the driven shaft 6 is then operated directly by the driving shaft 5 while the several pinions and the planetary gear run idle.

Finally the reverse drive is obtained by carrying pinion 29 in mesh with pinions 22 and 24 which are at the side of each other while said pinion 29 is adapted to mesh with both of them at the same time.

The reverse drive is then obtained as follows:—driving shaft 5, pinions 27—26, countershaft 7, pinion 24, reversing idle pinion 29, pinion 22, sleeve 16, planetary rim 12 and roller carrier 9, the driven shaft 6 being solid with this last member.

The pinions 22—23—29 are of course controlled by any suitable or conventional device, as well known in change speed gears.

The arrows marked I, II, III, IV, and R on the drawing show the positions of the pinions and other parts for obtaining the several operative conditions above described.

The described construction provides a change speed gear by which the direct drive and drives under reduced speed ratios may be obtained, the number of available ratios depending upon the number of pairs of pinions by which the drive may be imparted to the rotary rim 12 of the planetary gear.

The use of a planetary gear in the described arrangement provides the best possible conditions for operation and maintenance because said planetary gear is subject to maximum stress when it operates for drive with lowest speed and reverse, that is in respect of conditions which are not usually operative in motor car practice, while the stresses are reduced in respect of second speed and are further reduced to a minimum in respect of third speed which is operated to a large extent in road vehicles, because in this condition the rim 12 is driven directly by the driving shaft and actuates under a reduced ratio the roller carrier 9 and shaft 6.

Finally in direct drive the rim 12 is rotated with high speed and thus operates as a fly wheel, its arrangement being such as to take advantage of the well known operative advantages of roller planetary gears for the purpose of damping vibrations and shocks occurring in the gear.

The change speed gear comprising pinions 22—23—24—25—26—27—29 could be replaced by a change speed gear of a different construction because it is merely intended to alter the ratio of speed imparted to rim 12 of the planetary gear. The described construction is the preferred one because the sleeve 16 and countershaft 7 are very short and pinions 22—23—24—25—26 are located at the ends of respective shafts and therefore they are in close proximity with respect to shaft bearings.

Further the arrangement of the planetary gear on the rear of the partition 4 of the casing 1 and separate with respect to other members provides a free space for the said planetary gear without obstruction by the countershaft 7.

The provision of an annular chamber 36 confined by an inwardly projecting edge or shield 30 is directed to prevent fragments which may leave the clutch teeth 19—20 and 21 during the gear operation, from entering the planetary gear, said fragments collecting at the edge of said chamber and being prevented from reaching the running surfaces for rollers 10.

The lubrication of the planetary gear is provided by arranging on the countershaft 7 a disc 31 preferably having blades 32 moving adjacent the flange 13 of the rotary rim 12 and dipping in oil contained in casing 1, said flange 13 having ports 33 to provide for the flow into the gear of the oil collected by said blades 32 and projected under centrifugal action on the flange 13.

The described gear is compact and light and further it produces no noise owing to the use of a roller-planetary gear and to the comparatively large size which may be imparted to pinions in view of the described arrangement.

What I claim as my invention and desire to secure by United States Letters Patent is:—

1. A change speed gear for road vehicles comprising a planetary gear consisting of a stationary rim, a concentric rotary rim, intermediate satellite rollers and a rotary carrier for said rollers; a driven shaft solid with said carrier, a driving shaft, speed change means, and means for selectively connecting said driving shaft directly with said carrier and driven shaft, or with said rotary rim either directly or through the intermediate of said speed change means.

2. A change speed gear for road vehicles comprising a planetary gear consisting of a stationary rim, a concentric rotary rim, intermediate satellite rollers and a rotary carrier for said rollers; a driven shaft solid with said carrier, a driving shaft concentric with said carrier and driven shaft, speed change means, a clutching member adapted to connect said driving shaft with said carrier and driven shaft or with said rotary rim and means for selectively connecting said driving shaft with said rotary rim through the intermediate of said speed change means.

3. A change speed gear for road vehicles, comprising a planetary gear consisting of a stationary rim, a concentric rotary rim, intermediate satellite rollers and a rotary carrier for said rollers; a driven shaft solid with said carrier, a driving shaft, clutching means for connecting selectively said driving shaft with said rotary rim or with said carrier and driven shaft, a member solid with said rotary rim, pinions on said member, a countershaft driven by said driving shaft, pinions on said countershaft, the said first named pinions and said countershaft pinions being adapted to be carried in mesh with each other, and means for controlling said member and pinions.

4. A change speed gear for road vehicles comprising a casing, means providing compartments in said casing; a planetary gear in one of said compartments, said planetary gear comprising a stationary rim, a concentric rotary rim, intermediate satellite rollers and a rotary carrier for said rollers; a driven shaft solid with said carrier, a driving shaft, speed change means and means for selectively connecting said driving shaft directly with said carrier and driven shaft, or with said rotary rim either directly or through the intermediate of said speed change means, said speed change means being located in another compartment of said casing with respect to first named compartment.

5. A change speed gear for road vehicles, comprising a planetary gear consisting of a stationary rim, a concentric rotary rim, intermediate satellite rollers and a rotary carrier for said rollers, a driven shaft solid with said carrier, a driving shaft, clutching means for selectively connecting said driving shaft with said rotary rim or with said carrier and driven shaft, a sleeve encircling said driving shaft, means on said sleeve and planetary rotary rim for making them removably solid with each other, pinions on said sleeve, a countershaft driven by said driving shaft, pinions on said countershaft, the said first named pinions and said countershaft pinions being adapted to be carried in mesh with each other, and means for controlling said sleeve and pinions.

6. A change speed gear for road vehicles comprising a planetary gear consisting of a stationary rim, a concentric rotary rim, intermediate satellite rollers and a rotary carrier for said rollers, a driven shaft solid with said carrier, a driving shaft concentric with said carrier and driven shaft, speed change means, a clutching member adapted to connect said driving shaft with said carrier and driven shaft or with said rotary rim, an annular shield encircling said clutching member, and means for selectively connecting said driving shaft with said rotary rim through the intermediate of said speed change means.

7. A change speed gear for road vehicles comprising a planetary gear consisting of a stationary rim, a concentric rotary rim, intermediate satellite rollers and a rotary carrier for said rollers; a driven shaft solid with said carrier, a driving shaft, speed change means, and means for selectively connecting said driving shaft directly with said carrier and driven shaft, or with said rotary rim either directly or through the intermediate of said speed change means, a casing encircling the above named parts and a disc driven by one of said shafts, said disc dipping in oil contained in said casing and having its rim adjacent to said planetary gear to supply oil to the same.

In testimony whereof I have signed my name to this specification.

RAFFAELE MATTEUCCI.